US008006235B2

(12) United States Patent
Broman et al.

(10) Patent No.: US 8,006,235 B2
(45) Date of Patent: Aug. 23, 2011

(54) PROFILER MANAGEMENT

(75) Inventors: David Broman, Redmond, WA (US);
Jonathan Keljo, Seattle, WA (US);
Vance Morrison, Kirkland, WA (US);
Sean Selitrennikoff, Sammamish, WA (US); Hsu-chieh Yuan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1080 days.

(21) Appl. No.: 11/760,901

(22) Filed: Jun. 11, 2007

(65) Prior Publication Data
US 2008/0307396 A1 Dec. 11, 2008

(51) Int. Cl.
*G06F 9/44* (2006.01)

(52) U.S. Cl. ........ 717/130; 717/127; 717/128; 717/131; 717/151; 717/158

(58) Field of Classification Search .................... 717/130
See application file for complete search history.

(56) References Cited

U.S. PATENT DOCUMENTS

| 6,484,188 | B1  |   | 11/2002 | Kwong et al. |         |
|-----------|-----|---|---------|--------------|---------|
| 6,714,976 | B1  | * | 3/2004  | Wilson et al.| 709/224 |
| 6,766,349 | B1  |   | 7/2004  | Belkin       |         |
| 6,928,639 | B2  | * | 8/2005  | Juan et al.  | 717/127 |
| 6,934,935 | B1  | * | 8/2005  | Bennett et al.| 717/127 |
| 7,013,456 | B1  | * | 3/2006  | Van Dyke et al.| 717/130 |
| 7,293,260 | B1  | * | 11/2007 | Dmitriev     | 717/130 |
| 7,496,907 | B2  | * | 2/2009  | Hind et al.  | 717/158 |
| 2002/0010913 | A1 | * | 1/2002 | Ronstrom    | 717/9   |
| 2003/0066060 | A1 | * | 4/2003 | Ford         | 717/158 |
| 2003/0192036 | A1 |   | 10/2003 | Karkare et al. |       |
| 2005/0071834 | A1 |   | 3/2005  | Gates et al. |         |
| 2005/0102656 | A1 |   | 5/2005  | Viehland et al. |      |
| 2005/0187908 | A1 |   | 8/2005  | Madan et al. |         |
| 2006/0059486 | A1 |   | 3/2006  | Loh et al.   |         |
| 2006/0195846 | A1 | * | 8/2006  | Benedetti    | 718/102 |
| 2007/0074170 | A1 | * | 3/2007  | Rossmann     | 717/127 |

OTHER PUBLICATIONS

Hamilton, "Language Integration in the Common Language Runtime", vol. 38, ACM Press, 2003, pp. 19-28.
"CLR Profiler for the .NET Framework", available at least as early as Mar. 15 2007 at <<http://sharptoolbox.com/tools/clr-profiler-for-the-net-framework>>, SharpToolBox, 2007, pp. 1.

* cited by examiner

*Primary Examiner* — Thomas K Pham
(74) *Attorney, Agent, or Firm* — Russell S. Krajec; Krajec Patent Offices, LLC

(57) ABSTRACT

A profiler manager may attach and detach profilers from a running application. A profiler may be detached through a two step process where the profiler is sealed from communicating with the running application, then an evacuation step where the application is able to complete any responses that are pending. While the profiler is in the evacuation phase, another profiler may be attached to the application. Messages to the evacuating profiler may be captured and directed to the proper profiler.

19 Claims, 5 Drawing Sheets

PROFILER MANAGEMENT

BACKGROUND

Profilers are performance analysis tools that may be used to monitor the performance of a program or application when running. A profiler may assist a developer by collecting many different runtime statistics and other information about the application. Profilers may use a wide variety of techniques for collect data, including hardware interrupts, code instrumentation or modification, operating system interfaces, and performance counters.

Code instrumentation is a mechanism by which a profiler may make modifications to the application code to, among other things, send data to the profiler. In some embodiments, a virtual machine or other managed environment may be used to compile an application or portion of an application at the time the application is run. Such a compilation may be known as just in time compiling.

Different profilers may have different capabilities. Some profilers may monitor many statistics or variables and produce a heavy computational burden on a system. Other profilers may monitor a few data points and have a lighter burden on the system, which may affect application performance.

SUMMARY

A profiler manager may attach and detach profilers from a running application. A profiler may be detached through a two step process where the profiler is sealed from communicating with the running application, then an evacuation step where the application or profiler is able to complete any responses that are pending. While the profiler is in the evacuation phase, another profiler may be attached to the application. Messages to the evacuating profiler may be captured and directed to the proper profiler.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
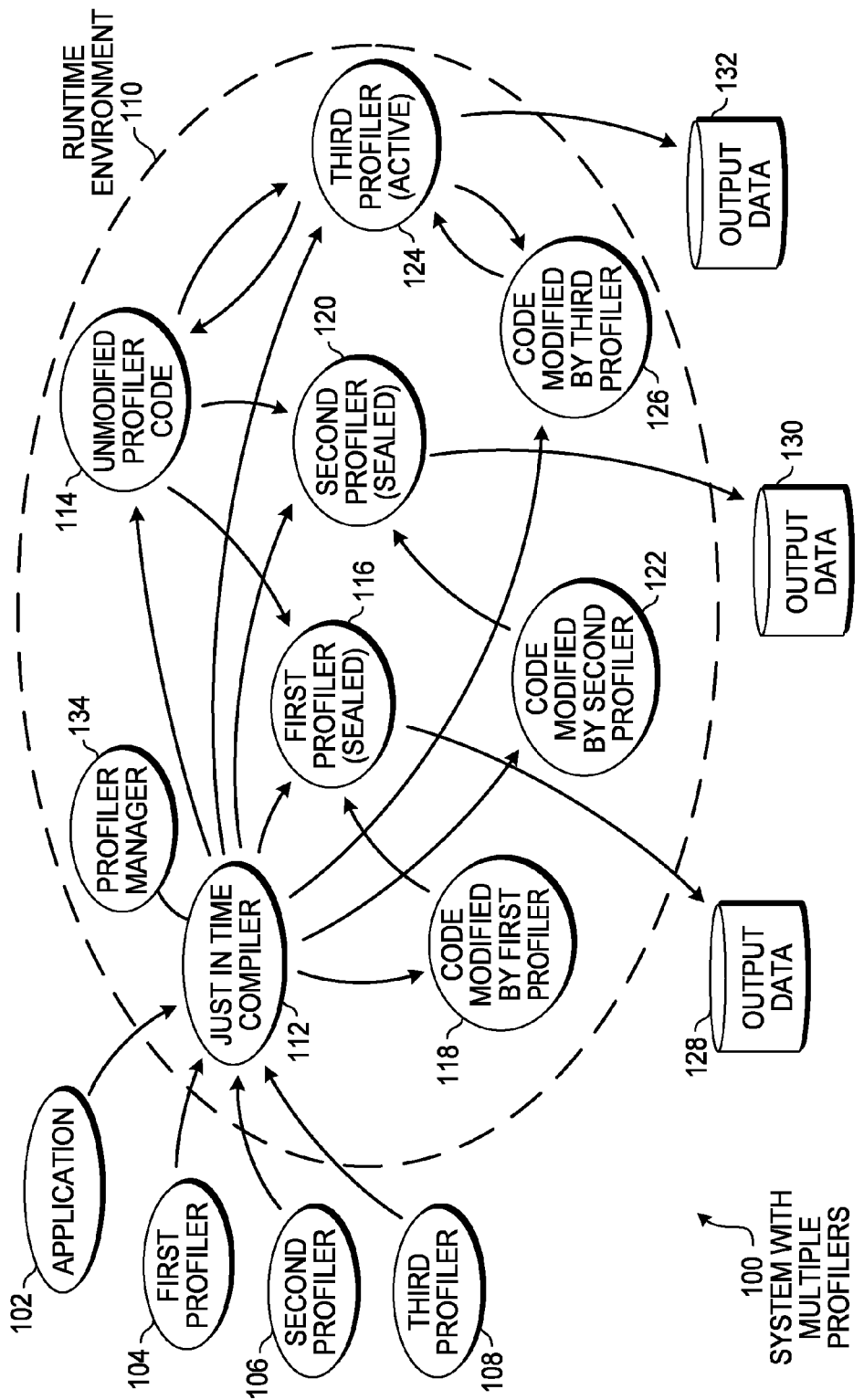
FIG. 1 is a diagram of an embodiment showing a system with multiple profilers.

A profiler management tool may attach and detach profilers to a running application. A profiler may be detached from an operating program or application by first sealing the profiler from communicating with the application, then evacuating the profiler by waiting for any profiler-modified code to complete execution and cleaning up any other profiler-created items and shutting down the profiler.

During the evacuating phase of detaching, a new profiler may be attached to the running application. Also, messages directed at the evacuating profiler may be captured and directed to the evacuating profiler or dropped, depending on the circumstance. In some instances, multiple profilers may be in the evacuation phase while a profiler is attached to the running application.

Profilers may be used to monitor and extract data from running applications. In many instances, a profiler may passively monitor various memory states, function calls, operating system interfaces, or other items. In other instances, various hooks or other modifications may be made to the running application so that data may be sent from the application to the profiler for cataloging and monitoring.

The profiler management tool may use an estimated evacuation time provided by one or more profilers in the evacuation phase to determine a scan time. The scan time may be the time at which the status of the various evacuating profilers may be analyzed to determine if one of the profilers may be removed.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing an operation with multiple profilers. A profiler is an analysis tool that measures the behavior of a program or application as it runs. The profiler may collect data or take measurements about the application in several manners, including passively observing different factors, actively querying the application, and by embedding a hook or other changes to the application code to transmit data to the profiler or respond to messages from the profiler, among other operations. In some cases, the modified application code may initiate communication with the profiler.

In general, one profiler may be attached to an application at a time. In many cases, a profiler may instrument an application by modifying or adding code to the application. The modified code may perform specific functions for the profiler, such as collect specific sets of data, respond to a query from the profiler, transmit specific information to the profiler in a specific manner, or other profiler-specific functions.

In order to detach a profiler smoothly, two profiler functions may be monitored until completion. First, the application code that may have been modified by the profiler may be allowed to finish execution and be replaced with unmodified code. Second, a profiler may have pending requests made to the application and the profiler may be waiting for the responses in order to finish a specific task.

A profiler may be sealed and prevented from transmitting additional requests or otherwise initiating an interaction with the application. The sealing process may halt new communications from being established between application code and a profiler. In some embodiments, the sealing process may prevent messages from being received by the profiler. Each embodiment may have a different mechanism for sealing a profiler. After sealing, a new profiler may be added to the application and the sealed profiler may be monitored so that profiler-modified code may be completed in addition to any pending requests. In some embodiments, the profiler-modified code may be replaced with unmodified application code.

Such a process may be referred to as evacuating the profiler. The final steps of evacuation may be to halt the profiler and remove the profiler from memory.

An application 102 and several profilers 104, 106, and 108 may interact in a runtime environment 110. The application 102 may be any type of computer program that performs any type of function.

The runtime environment 110 may be any type of environment wherein an application 102 may be operated. In some instances, the runtime environment 110 may be an operating system environment, while in other instances it may be a virtual machine environment. A virtual machine environment may be a virtualized environment between the application 102 and an operating system. In many virtual machine environments, an application may be operated within many different virtual machines that are operating on different hardware platforms, making the application portable.

Examples of an application virtual machine environment include Common Language Runtime, EiffelStudio, Forth Virtual Machine, Glukx, Hasm Assembler, Inferno, Java Virtual Machine, Low Level Virtual Machine (LLVM), Macromedia Flash Player, Perl Virtual Machine, Portable.NET, Smalltalk Virtual Machine, TrueType Virtual Machine, and others. Such environments may operate one or more applications within an operating system environment as a virtual machine. Other applications or programs may simultaneously operate directly with the operating system. Other technologies may also be used to operate the application 102 and profilers 104, 106, and 108.

In many cases, a runtime environment 110 may provide specialized services that may be used by the profilers 104, 106, and 108. In embodiments where a runtime environment 110 is not employed, other applications may be used to perform different functions described in this specification. For the purposes of this specification, an example of a profiler operating in a runtime environment may be used to exemplify and describe operational characteristics. However, a profiler and the detachment mechanisms for the profiler may be performed without a runtime environment.

In the runtime environment 110, a just in time compiler 112 may compile all or a portion of the application 102 and the profilers 104, 106, and 108. The application 102 and profilers 104, 106, and 108 may be an intermediate code, such as bytecode, that is partially compiled. In some embodiments, the profilers 104, 106, or 108 may modify or insert portions of code in the application during the operation of the just in time compiler 112.

Application 102 and profilers 104, 106, and 108 may be any type of computer executable programs or commands. In some instances, the application 102 and profiler 104, 106, and 108 may be a source code that is compiled, a script or other interpreted commands, or machine executable binary code. Various embodiments may use different systems for generating machine readable or executable code.

A just in time compiler 112 may be used in a runtime environment 110 to perform a secondary or final compiling from byte code to machine executable code. Just in time compilers may perform the compiling at runtime, and may compile all or a portion of an application initially. When one of the profilers 104, 106, and 108 are present, in some instances a profiler may interject code or change code in the application 102 at compile time. In other cases, a profiler may interject or change code after compiling.

After compiling and when the profiler and application are operational, three different types of code may be running. Profiler runtime code 116, 120, and 124 may be performing profiling functions and interacting with unmodified application runtime code 114 and modified application runtime code 118, 122, and 126. In a typical embodiment, the application code, both modified and unmodified, may be running as a single application.

The modified and unmodified code is illustrated in the present figure as separate entities but may comprise a single set of executing code in practice. The modified and unmodified application runtime code is illustrated separately because detaching processes for the profilers operate on modified and unmodified application runtime code differently.

During normal operation, the profiler runtime code 116, 120, or 124 may interact with unmodified and modified application code to gather and analyze data to produce output data 128, 130, and 132, respectively. The output data may be real time data that enables real time tracking and monitoring of the application, data that is stored and analyzed at a later time, or any other type of output data.

A profiler may be detached from a running application in two distinct steps. The first step may be to seal the profiler from new communication with the application. The second step may be to evacuate the profiler by undoing the various hooks or modified code in the application, waiting for any unanswered queries to be returned, and cleaning up any other items so that the profiler may be shut down. After detaching has been completed, the application may operate in a normal mode without the profiler present.

In embodiment 100, the first profiler 116 and second profiler 120 have been sealed, preventing the two profilers from receiving communications from application code, transmitting any requests to the application code and, in some embodiments, from receiving notifications from the runtime environment. The third profiler 124 has been added and is able to interact with the unmodified profiler code 114 and the code modified by the third profiler 126.

The first profiler 116 and second profiler 120 have been sealed, but may be waiting for responses from either the unmodified profiler code 114 or the modified code 118 or 122, respectively. After any pending responses are received and the modified code 118 or 122 has completed processing, the sealed profilers may be removed from the system.

In many runtime environments 110, a profiler manager 134 may provide some specialized services that may be used during a detach process. For example, the runtime manager 134 may keep track of which sections of application runtime code have been modified by a profiler, enabling a detach process to happen simply. In another example, a runtime manager 134 may track the various communications between a profiler and an application and be able to determine if any communications are pending. Other functions may also be performed by a runtime manager 134 that may otherwise be performed by the profiler or some other software or hardware device to enable a detachment of a profiler from an application.

In some embodiments, the detachment function may be performed by the profiler itself without assistance from a runtime manager within a runtime environment. In other embodiments, various services or functions of a runtime environment may be used to facilitate the detachment function.

Figure 2:
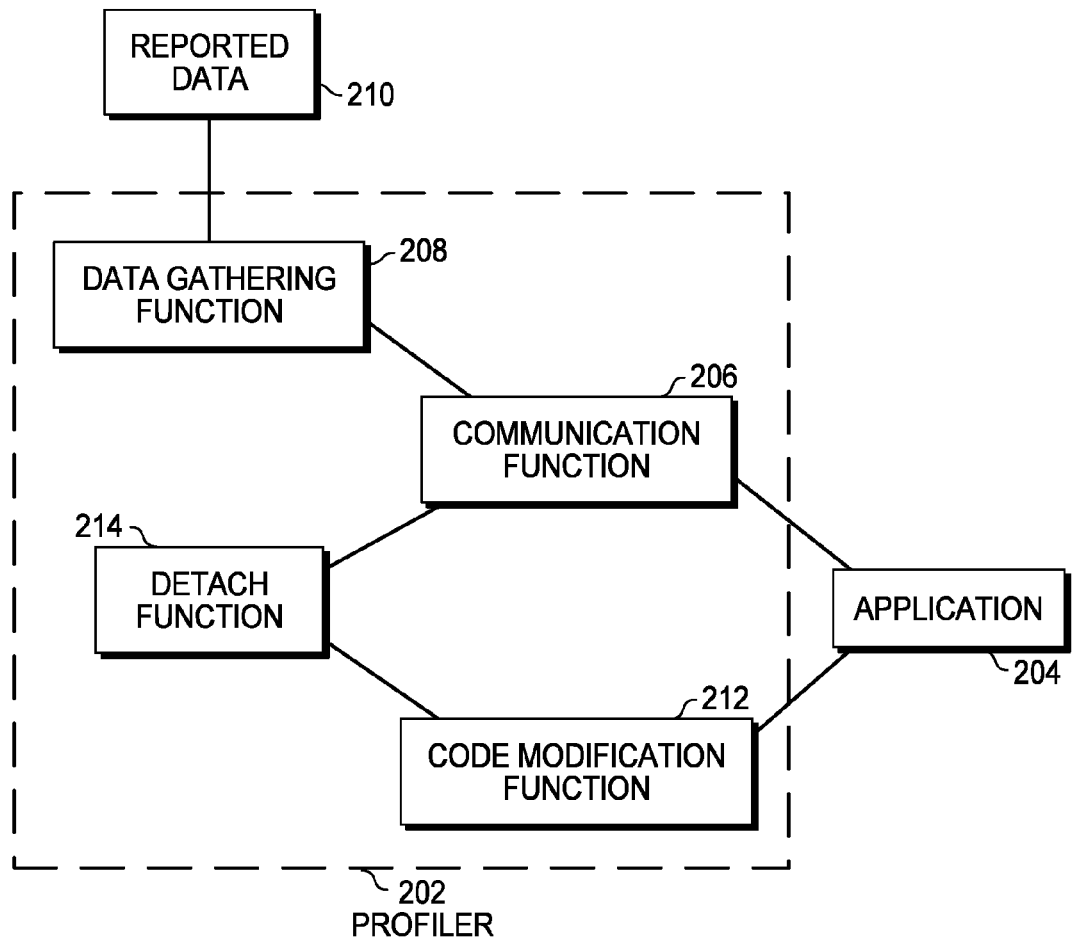
FIG. 2 is a diagram of an embodiment showing a profiler with various components.

FIG. 2 is a diagram of an embodiment 200 showing a profiler with various elements within the profiler. Profilers are devices that monitor a running application. Many profilers are capable of event driven operation, where a profiler monitors various events such as function calls, class loads or unloads, thread entry and exit. Some profilers provide statistical sampling of a target application's program counter or other parameter.

Still other profilers provide instrumentation to an operating application. Instrumentation may be any type of modification or insertion of hooks or other code in various operational areas of a monitored application. For example, in some applications, specific instructions may be added to an application for the purposes of supplying data to a profiler. In some cases, the modifications may be made during compiling, while other modifications may be made after compiling when the application is in a binary executable form. Still other embodiments may provide instrumentation during runtime, either directly before an application is run or during actual operation.

Various profilers may use one or more techniques to monitor an application. In many cases, different profilers may be used for different applications. For example, a heavily instrumented profiler may be used for low level debugging where a large amount of data may be collected. Such a profiler may have considerable performance implications on the application, while a lightweight statistical or event based profiler may be used for later verification and monitoring of different performance characteristics.

The profiler 202 may interface with and monitor an application 204 to produce reported data 210. The profiler 202 may have a communication function 206 that may communicate with the application 204 and handle direct requests to the application 204 and receive data or other responses from the application 204.

The data gathering function 208 may gather and analyze the data collected through the communication function 206 to provide the reported data 210.

The code modification function 212 may provide various instrumentation elements or code modifications to the application 204. The modifications may include hooks or event handlers that may report data about program flow, data, or other information to the communication function 206. In some instances, the modifications may include functions that may be called by the profiler to respond with certain data or notification about specific events.

The detach function 214 may provide a mechanism for detaching the profiler 202 from the application 204. When the detach function 214 is invoked, the detach function 214 may cause the communication function 206 to cease initiating or responding to new communications with the application 204, then clean up any modified application code, receive any pending requests from the application 204, and perform any other clean up operations before closing down the profiler 202.

The detach function 214 may provide some administrative functions during normal operation so that a detach operation may perform smoothly. For example, when the code modification function 212 inserts code or changes code in the application 204, the location of the modification may be tracked. When tracking the modification, an unmodified version of the portion of application code may be stored for reinsertion during a detach operation.

Another administrative function of the detach function 214 may include monitoring the pending requests for communication with the application 204. One mechanism for monitoring the pending requests is to define each communication as a single request followed by a single response. Using such a definition, a counter may be decremented once for each outgoing communication from the profiler 202 to the application 204 and incremented once for each incoming communication. By inspecting the counter, the number of pending requests may be determined. Other embodiments may use other mechanisms for monitoring the number of outstanding or pending communications.

In some embodiments, some or all of the administrative functions may be handled by other monitoring programs or by a service in a runtime environment.

Figure 3:
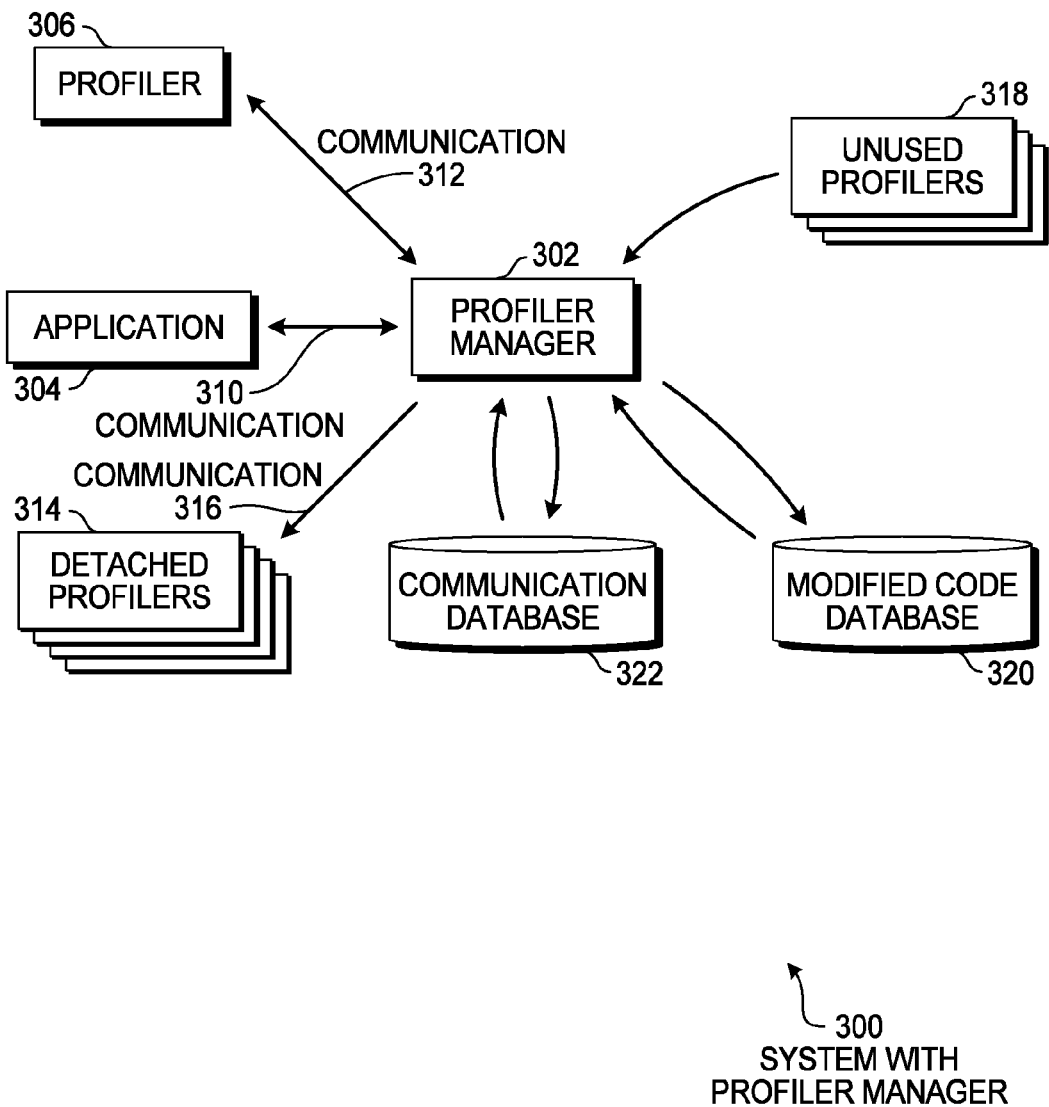
FIG. 3 is a diagram of an embodiment showing a system with a profiler manager.

FIG. 3 is a diagram illustration of an embodiment 300 showing a system with a profiler manager. The embodiment 300 illustrates an architecture whereby a profiler manager 302 performs several administrative tasks associated with adding and removing profilers from a target application. The profiler manager 302 may operate within a runtime environment such as a virtual machine environment. In other embodiments, the profiler manager 302 may operate as a standalone application or service in an operating system environment.

The embodiment 300 is an idealized representation of an implementation. Other implementations may perform some or all of the functions described in the embodiment 300 using different components of the system. For example, some of the administrative functions described for the profiler manager 302 may be performed by a profiler, by an operating system level service, or by a separate standalone service or application.

The profiler manager 302 may attach profilers to the application 304 and detach the profilers. During operation with the profilers, the profiler manager 302 may track application code that has been modified in a modified code database 320 as well as communications between a profiler and the application 304 through a communication database 322.

The profiler manager 302 is shown with an active profiler 306 that may transmit and receive communications 310 with the application 304. When the application 304 sends a communication 310, the communication 310 may be routed to the profiler manager 302. The profiler manager 302 may determine which of the detached profilers 314 or the active profiler 306 to forward the communication 316 or 312, respectively. The profiler manager 302 may be able to determine which of several detached profilers 314 to send the communication 316 and route the response accordingly. In many embodiments, a communication sequence may originate with the application 304 sending a request that is then routed or halted appropriately.

The communication database 322 may track the various communications between the profilers 314 and 306 and the application 304. A detached profiler may be a profiler that has been sealed and is in the process of being evacuated. After evacuation is complete, the profiler may be removed. In many instances, a profiler may send a request for information to the application 304 and the response may occur at a much later time, which may be many minutes, hours, or even days later. The response may come at a time when the profiler that requested the response has begun to detach and moved to the detached profilers 314. During that time, the profiler may still be loaded and able to receive and process the response, but another profiler may be attached to the application 304.

In some embodiments, a communication protocol or contract may be defined between a profiler and a target application. The protocol may define a single request from a profiler to have a single response by an application. When such a protocol may be used, a simple counter may be incremented for each communication sent from an application and decremented for each response received. Such a counter may be stored in the communication database 322 and be used to determine how many communications are pending. Other embodiments may use different mechanisms for monitoring pending communications between a profiler and a target application.

In some embodiments, a communication 310 between an application 304 and a profiler may have an identifier attached to or embedded into the communication 310. The identifier may be used to determine which of the current profiler 306 or one of the detached profilers 314 is the intended recipient. In many embodiments, the identifiers or other information may be stored in the communication database 322 for routing the communication 310 appropriately.

When a profiler is detached, any code that has been modified by the profiler may be replaced by unmodified code. Some of the modified code may be on the call stacks and in the process of execution, while other portions of the modified code may be stored in memory for future processing.

The profiler manager 302 may track code modified by each profiler in the modified code database 320. In some embodiments, the modified code database 320 may include pointers or other indicators of the location of the modified code within the application 304 as well as copies of unmodified versions of the code or pointers to unmodified versions.

As a profiler is detached, the profiler manager 302 may replace any modified code that is not being executed with unmodified versions of the code. Additionally, the profiler manager 302 may track modified code that is being executed and replace that code when the code finishes execution.

The profiler manager 302 may track modified code in numerous ways. In some embodiments, the profiler manager 302 may track modified code from the point the code is modified by determining when a code modification occurs and tracking information about the code modification. Tracked information may include the scope of the modification, which profiler performed the modification, and other information that may be useful in undoing the modification during a detachment process for the profiler.

Another way a profiler manager 302 may determine modified code is to scan functions residing in code stacks as well as executable code in memory to determine which areas have been modified by a profiler. In some instances, the scanning may identify markers or other information embedded by a profiler when the code was modified. In other instances, a comparison may be done between a known good unmodified version of the application code and the current version to determine which areas have been changed.

The profiler manager 302 may be capable of detaching the operating profiler 306, moving the profiler 306 to the detached profilers stack 314, and attaching one of the unused profilers 318 to the application 304.

Figure 4:
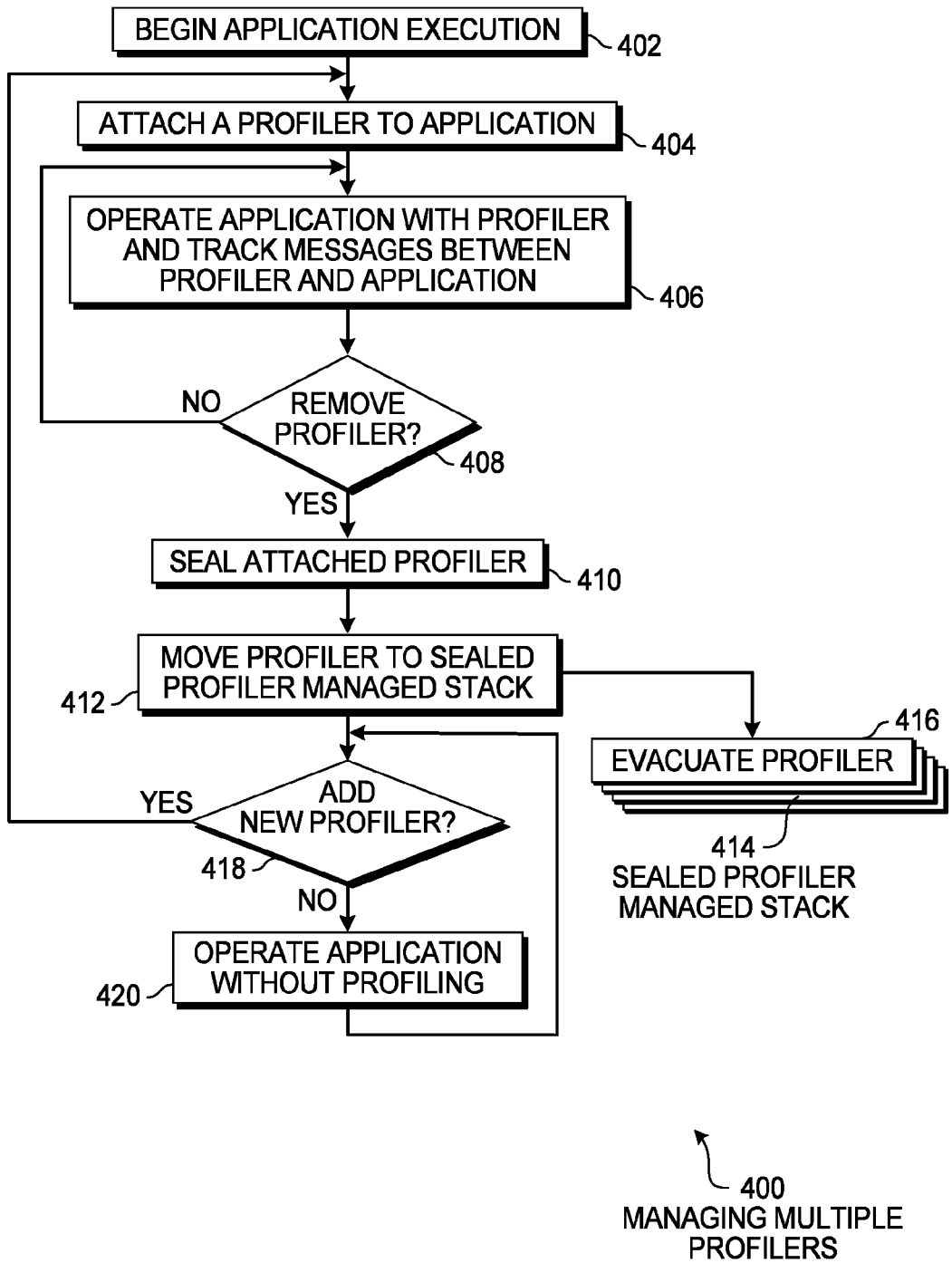
FIG. 4 is a flowchart illustration of an embodiment showing a method for managing multiple profilers.

FIG. 4 is a flowchart illustration of an embodiment 400 showing a method for managing multiple profilers. The embodiment 400 is one method that may be performed by a profiler manager, a service within a managed code environment, or some other application or service. In other embodiments, some or all of the steps described in embodiment 400 may be performed by a profiler, an application, or a combination of both.

The application begins execution in block 402 and a profiler is attached in block 404. In some embodiments, the application may be started simultaneously with the profiler, while in other embodiments, the profiler may be started before the application.

The application is operated with the profiler in block 406 and messages are tracked between the profiler and application. The messages may be tracked using any mechanism. In some embodiments, each message or request from a profiler may be tracked along with each response. In other embodiments, a counter may be decremented for each outgoing request from a profiler and incremented for each incoming response. Different embodiments may use different tracking mechanisms for monitoring pending communications. In some embodiments, messages may not be tracked at all.

When the profiler is to be removed in block 408, the profiler may be sealed in block 410. The sealing process may include preventing the profiler from sending requests to the application. In some cases, a message may be sent to the profiler which may have a function that turns off any further requests. In other cases, any messages sent by the profiler or application may be intercepted and discarded. In still other cases, the application may be prevented from receiving the messages using some other mechanism.

After sealing the profiler in block 410, the profiler may be moved to a managed stack of sealed profilers 414. While in the stack 414, each profiler may undergo an evacuation process 416 that is described in detail in embodiment 500 illustrated in FIG. 5.

If a new profiler is to be added in block 418, the process returns to block 404, otherwise the application is operated without profiling in block 420.

Figure 5:
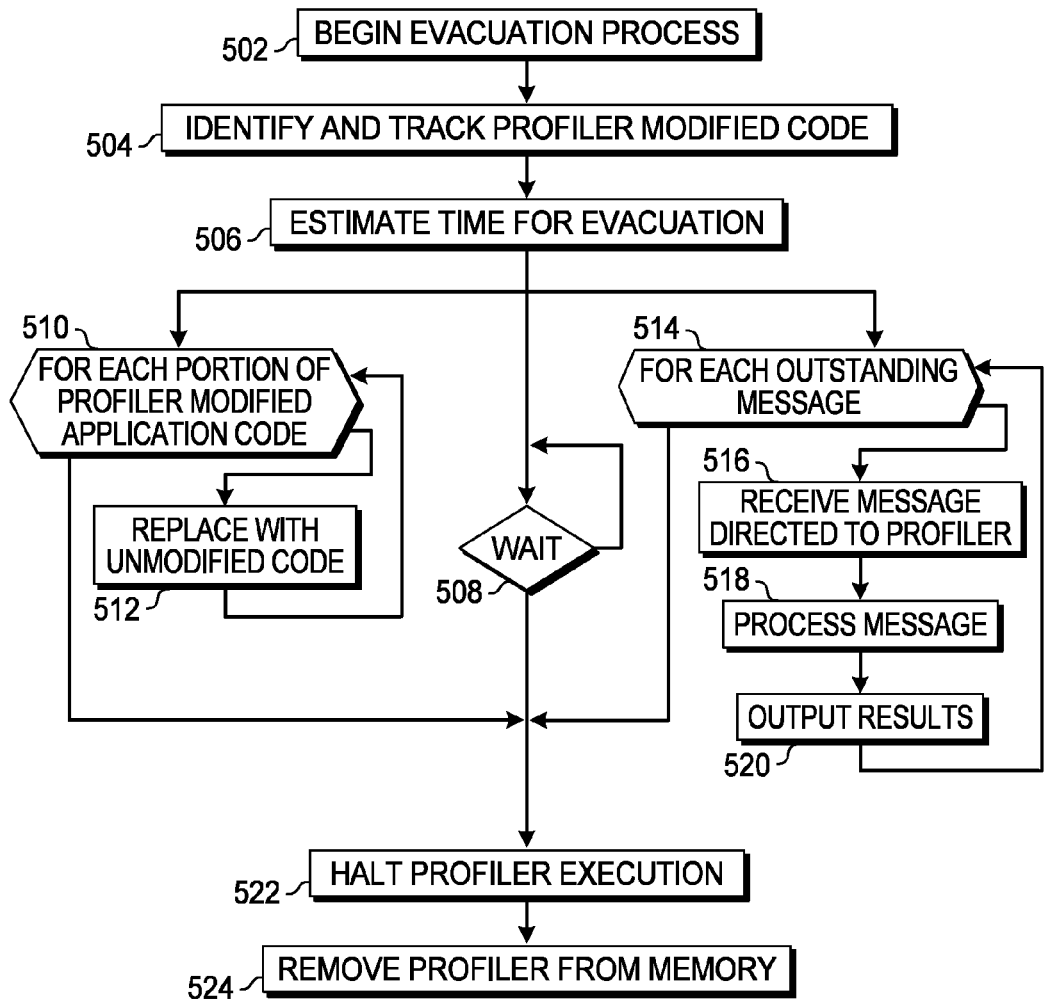
FIG. 5 is a flowchart illustration of an embodiment showing a method for evacuating a profiler.

FIG. 5 is a flowchart illustration of an embodiment 500 showing an evacuation process. Embodiment 500 illustrates a method by which a profiler manager or other application may manage the evacuation process of a profiler. Embodiment 500 may be one of multiple evacuation processes that are illustrated in the managed stack of sealed profilers 414 illustrated in FIG. 4. In many embodiments, multiple profilers may be undergoing evacuation and removal simultaneously.

During an evacuation process, the application code modified by the profiler may be tracked and for each piece of modified code, replaced with an unmodified code. Also, each pending communication request from the profiler to the application may be received and processed by the profiler. After the communications have been processed and the modified code removed and replaced, the profiler may be halted and removed from memory.

In other embodiments, some or all of the processes described in embodiment 500 may be performed by various mechanisms. For example, the profiler may be capable of monitoring and replacing modified code. Other functions may be performed by different services or applications. Embodiment 500 illustrates the functionality from the standpoint of a managed code environment, such as a virtual machine or other type of managed environment.

The evacuation process begins in block 502.

Profiler modified code is identified and tracked in block 504. In some embodiments, such as embodiment 300, a database may be kept of any modified code. In other embodiments, a comparison between a known good unmodified set of executable application code may be made with existing code in memory. In still other embodiments, application code may be searched for portions that have been modified and flagged by a profiler. Any method or mechanism may be used to identify and track application code that has been modified by a profiler in block 504.

In some embodiments, an estimated time for evacuation may be determined in block 506. The estimated time may be provided by the profiler itself or may be determined through a monitoring program or a profiler manager. The estimated time may be used for a wait function as in block 508 to determine when periodic checks may be made to verify that the evacuation process has completed.

In some embodiments, the evacuation process for a profiler may take an extended amount of time. Because the evacuation process may wait for any profiler modified code to complete execution or for a response to be sent, applications with long processing times or applications that sleep or are paused for extended periods of time may have a long period of time expire before evacuation may be completed. By estimating an evacuation time, many periodic checks may be avoided.

For each portion of profiler modified application code in block 510, the code may be replaced in block 512. The code may be stored in memory prior to execution or may be functions in a call stack that are currently being executed. In the case of code being executed, the replacement process may wait until the executing code has finished before a replacement may be made. In some instances, such a wait period may be several seconds, minutes, or even hours and days.

Similarly, for each outstanding message that is expected from the application to the profiler in block 514, the message is received and directed to the profiler in block 516, the message is processed in block 518, and the results output in block 520. In some embodiments, a profiler manager may be adapted to receive messages and route the message to the appropriate profiler.

After each piece of modified code is replaced and each message processed, the profiler may be halted in block 522 and removed from memory in block 524.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
attaching a first profiler to an application;
detaching said first profiler from said application by sealing said first profiler from new communications with said application;
attaching a second profiler to said application while said application is executing;
identifying a modified portion of said application having been modified by said first profiler prior to sealing;
replacing said modified portion of said application with an unmodified portion of said application; and
performing a shutdown of said first sealed profiler.

2. The method of claim 1, said attaching a first profiler comprising compiling at least a portion of said application, said portion having been modified by said first profiler.

3. The method of claim 1, said attaching a first profiler being performed after said application is executing.

4. The method of claim 1, said detaching said first profiler further comprising evacuating said first profiler.

5. The method of claim 4, said evacuating comprising:
identifying at least one function of said application, said at least one function having been modified by said first profiler; and
waiting for said at least one function to finish executing.

6. The method of claim 4, said evacuating comprising:
determining that at least one response is pending from said application to said first profiler; and
waiting for said application to transmit said at least one response to said profiler.

7. The method of claim 1 further comprising:
receiving a first message from said application to said first profiler; and
transferring said first message to said first profiler.

8. The method of claim 1 further comprising:
 detaching said second profiler from said application by sealing said second profiler from new communications with said application;
 attaching a third profiler to said application while said application is executing;
 receiving a first message from said application to said first profiler;
 transmitting said first message to said first profiler;
 receiving a second message from said application to said second profiler; and
 transmitting said second message to said second profiler.

9. A computer readable storage medium comprising computer executable instructions adapted to perform the method of claim 1.

10. A profiler manager comprising:
 a profiler sealer adapted to seal a profiler from new communications with a target application;
 a profiler attachment mechanism adapted to attach a profiler to said target application;
 a profiler communication manager adapted to:
  receive a message from said target application;
  determine an intended profiler; and
  transmit said message to said intended profiler; and
 a profiler evacuator adapted to:
  identify a modified portion of said target application having been modified by a first sealed profiler prior to sealing;
  replace said modified portion of said target application with an unmodified portion of said target application; and
  perform a shutdown of said first sealed profiler.

11. The profiler manager of claim 10 further comprising:
 a profiler evacuator adapted to:
  identify an outstanding communication response from said target application to a first sealed profiler; and
  perform a shutdown of said first sealed profiler.

12. The profiler manager of claim 10, said sealing comprising receiving a sealing command from said profiler.

13. The profiler manager of claim 10, said sealing comprising preventing said messages from being received by said target application.

14. The profiler manager of claim 10, said intended profiler being a sealed profiler.

15. The profiler manager of claim 14, said intended profiler being one of a plurality of sealed profilers.

16. The profiler manager of claim 10 being executed within a managed code environment.

17. The profiler manager of claim 16, said managed code environment being a virtual machine environment.

18. A method comprising:
 attaching a first profiler to an application;
 detaching said first profiler from said application by sealing said first profiler from new communications with said application, said detaching being performed by identifying a modified portion of said application having been modified by a first profiler prior to sealing, replacing said modified portion of said application with an unmodified portion of said target application, and performing a shutdown of said first profiler;
 attaching a second profiler to said application while said application is executing; and
 evacuating said first profiler by:
  identifying at least one function of said application, said at least one function having been modified by said first profiler;
  waiting for said at least one function to finish executing;
  determining that at least one response is pending from said application to said first profiler; and
  waiting for said application to transmit said at least one response to said profiler.

19. A computer readable storage medium comprising computer executable instructions adapted to perform the method of claim 18.

* * * * *